(12) United States Patent
Lin et al.

(10) Patent No.: US 11,929,916 B2
(45) Date of Patent: Mar. 12, 2024

(54) METHOD AND DEVICE FOR DETERMINING TIME-TO-LIVE VALUE OF NODE IN MULTI-HOP NETWORK

(71) Applicant: MIDEA GROUP CO., LTD., Foshan (CN)

(72) Inventors: Yufan Lin, Foshan (CN); Yuhang Han, Foshan (CN); Sicong Yang, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 120 days.

(21) Appl. No.: 17/623,600

(22) PCT Filed: Dec. 31, 2019

(86) PCT No.: PCT/CN2019/130490
§ 371 (c)(1),
(2) Date: Dec. 29, 2021

(87) PCT Pub. No.: WO2021/103273
PCT Pub. Date: Jun. 3, 2021

(65) Prior Publication Data
US 2022/0263748 A1     Aug. 18, 2022

(30) Foreign Application Priority Data
Nov. 27, 2019   (CN) .......................... 201911184571.4

(51) Int. Cl.
   *H04L 45/00*     (2022.01)
(52) U.S. Cl.
   CPC .................... *H04L 45/20* (2013.01)

(58) Field of Classification Search
CPC ...... H04L 45/20; H04W 40/18; H04W 40/22; H04W 84/18
See application file for complete search history.

(56) References Cited

U.S. PATENT DOCUMENTS 10,944,669 B1 *   3/2021   Ramanathan ........... H04L 45/02
2009/0316697 A1   12/2009   Dakshinamoorthy et al.
(Continued)

FOREIGN PATENT DOCUMENTS

| CN | 104754649 A | 7/2015 |
|---|---|---|
| CN | 109862548 A | 6/2019 |
| EP | 1898574 A1 | 3/2008 |

OTHER PUBLICATIONS

International Search Report of PCT No. PCT/CN2019/130490.

*Primary Examiner* — Hashim S Bhatti (57) ABSTRACT

The present application relates to the field of wireless communication, and provides a method and a device for determining a TTL value of a node in a multi-hop network. The method includes: selecting a target node, sending, by the target node, a packet for requesting node state to a node in the multi-hop network based on a currently planned TTL value, and acquiring the node state to extract a unicast address feedback list; matching unicast addresses in the unicast address feedback list with unicast addresses in a unicast address scan list, and configuring the currently planned TTL value as the TTL value of the packet sent by the target node when it is determined that the unicast addresses in both lists are consistent. For the method and the device for determining a TTL value of a node in the multi-hop network according to the present application.

17 Claims, 6 Drawing Sheets

(56) References Cited

U.S. PATENT DOCUMENTS

2011/0069665 A1    3/2011  Erdmann et al.
2019/0098050 A1*  3/2019  Lumezanu ............ H04L 43/026
2019/0373608 A1*  12/2019  Weiss ................ H04W 72/0446

* cited by examiner

METHOD AND DEVICE FOR DETERMINING TIME-TO-LIVE VALUE OF NODE IN MULTI-HOP NETWORK

CROSS-REFERENCES TO RELATED APPLICATIONS

The present disclosure is a national phase application of International Application No. PCT/CN2019/130490, filed on Dec. 31, 2019, which claims priority to Chinese Application No. 201911184571.4 filed on Nov. 27, 2019, the entireties of which are herein incorporated by reference.

FIELD

The present application relates to the field of wireless communication, in particular to a method and a device for determining a time-to-live (TTL) value of a node in a multi-hop network.

BACKGROUND

A multi-hop network is constructed by nodes, including devices such as computers and cell phones, all of which are connected to each other wirelessly and then can forward data to each other over the network.

Time to live, referred to as TTL, the value of which is used to characterize hop count in a multi-hop network. In a multi-hop network, the lifetime of packets in the network is controlled by setting the TTL value at each node. In the traditional method, the TTL value of a node in a multi-hop network is determined based on experience. After the TTL value of the node is determined, it will be invariable during the whole product life cycle. Therefore, such multi-hop network node cannot adapt to a wider network scanning range, or redundant repeated transmissions are prone to occur in the compact multi-hop network range.

SUMMARY

The present application is directed to solve at least one of the problems in the prior art. The present application provides a method for determining a TTL value of a node in a multi-hop network, which is capable of determining a TTL value that should set for a node when sending a packet, to ensure that no redundant and invalid repeated transmissions are generated when packets are transmitted to other nodes in the multi-hop network.

The present application further provides a device for determining a TTL value of a node in a multi-hop network.

According to an embodiment of a first aspect of the present application, a method for determining a TTL value of a node in the multi-hop network is provided, including: sending, by the target node, a packet for requesting a node state to a node in the multi-hop network based on a currently planned TTL value, acquiring the node state fed back by the node, and determining a unicast address feedback list based on the node state; and matching unicast addresses in the unicast address feedback list with unicast addresses in a unicast address scan list corresponding to the target node to obtain a matching result, and determining a TTL value of the target node based on the matching result;

where the target node is a node in the multi-hop network, and the unicast address scan list is a list of addresses of all nodes in the multi-hop network that are in a working state detected by the target node.

According to the method for determining a TTL value of a node in the multi-hop network provided by the embodiment of the present application, a node sends a packet for requesting a node state to other nodes according to different TTL values, the node state is collected to generate the unicast address feedback list, unicast addresses in the unicast address feedback list are compared with unicast addresses in the acquired unicast address scan list, and the TTL value which should be set for the node when sending the packet is determined based on the comparison result, to ensure that no redundant and invalid repeated transmissions are generated when packets are transmitted to other nodes in the network.

According to an embodiment of a second aspect of the present application, a device for determining a TTL value of a node in a multi-hop network is provided, and the device includes:

a processor configured to send a packet for requesting a node state to a node in the multi-hop network based on a currently planned TTL value, acquire the node state fed back by the node, and determine a unicast address feedback list based on the node state; and a determining device configured to match unicast addresses in the unicast address feedback list with unicast addresses in a unicast address scan list corresponding to a target node to obtain a matching result, and determine a TTL value of the target node based on the matching result;

where the processor and the determining device belong to the target node, the target node is a node in the multi-hop network, and the unicast address scan list is a list of addresses of all nodes in the multi-hop network that are in a working state detected by the target node.

According to an embodiment of a third aspect of the present application, a router is provided, including the above-mentioned device for determining TTL value of a node in a multi-hop network According to an embodiment of a fourth aspect of the present application, an electronic device is provided, including a memory, a processor, and computer programs stored on the memory and executable on the processor, where the processor is configured to implement steps of the above-mentioned method for determining a TTL value of a node in a multi-hop network.

According to an embodiment of a fifth aspect of the present application, a non-transitory computer-readable storage medium is provided, having stored thereon computer programs, when executed by a processor, the computer programs causes the processor to implement steps of the above-mentioned method for determining a TTL value of a node in a multi-hop network.

Additional aspects and advantages of the present application will be partially given in the following description, and some parts will be shown from the following description, or be understood through the practice of the present application.

BRIEF DESCRIPTION OF THE DRAWINGS

In order to more clearly illustrate the embodiments of the present application or the prior art, drawings needed in the descriptions of the embodiments or the prior art will be briefly described below. The drawings in the following description only show embodiments of the present application.

DETAILED DESCRIPTION OF THE DISCLOSURE

Embodiments of the present application are described in further detail below in conjunction with accompanying drawings and examples. The following embodiments are employed only to illustrate the present application, but are not intended to limit the scope of the present application.

With respect to the description of the embodiments of the present application, it should be noted that the orientation or positional relationship indicated by the terms such as "center," "longitudinal," "lateral," "upper," "lower," "front," "back," "left," "right," "vertical," "horizontal," "top," "bottom," "inner," "outer" is based on the orientation or positional relationship shown in the drawings, the purpose of which is only to facilitate describing the embodiments of present application and simplify the description, rather than to indicate or imply that the device or element referred to must have a specific orientation, be constructed and operated in a specific orientation, and therefore cannot be construed as a limitation of the present application. In addition, the terms "first," "second," "third" and the like are for descriptive purpose only, and cannot be understood as indicating or implying the relative importance.

With respect to the description of the embodiments of the present application, unless otherwise clearly specified or defined, it should be noted that the terms "connect with," "connect to" should be understood in a broad sense, as an illustration, it can be a fixed connection or a detachable connection, or an integral connection; it can be mechanically or electrically connected, directly connected or indirectly connected through an intermediary.

In the embodiments of the present application, unless otherwise clearly specified or defined, the first feature being "above" or "below" the second feature may be the direct contact of the first and second features, or the indirect contact of the first and second features through an intermediary. Moreover, the first feature being "above" the second feature may be the first feature being directly above or diagonally above the second feature, or may indicate only that the level of the first feature is higher than the second feature. The first feature being "below" the second feature may be the first feature being directly below or diagonally below the second feature, or may indicate only that the level of the first feature is lower than the second feature.

In the description of the specification of the present application, the reference terms "one embodiment," "some embodiments," "examples," "specific examples," "some examples" and the like mean that the specific feature, structure, material or characteristic described in conjunction with the embodiment or example is included in at least one embodiment or example of the present application. In the specification, the schematic representations of the above-mentioned terms do not necessarily refer to the same embodiment or example. Moreover, the described specific features, structures, materials or characteristics can be combined in any one or more embodiments or examples in a suitable manner.

Figure 1:
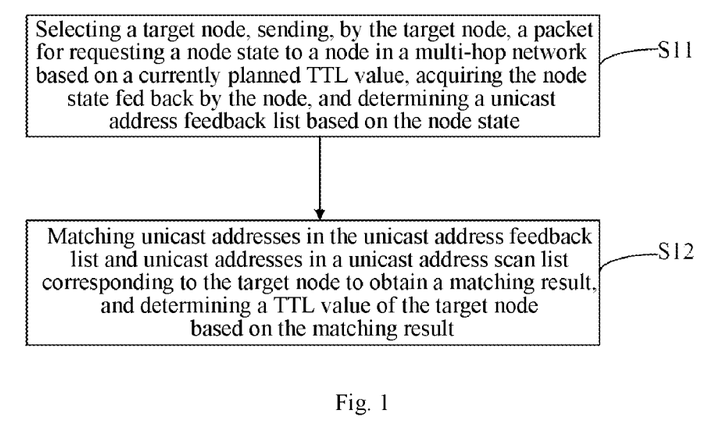
FIG. 1 is a schematic flowchart of a method for determining a TTL value of a node in a multi-hop network according to an embodiment of the present application.

FIG. 1 is a schematic flowchart of a method for determining a TTL value of a node in a multi-hop network according to an embodiment of the present application. As shown in FIG. 1, the method includes:

S11, sending, by the target node, packets for requesting node states to nodes in a multi-hop network based on a currently planned TTL value, acquiring the node states fed back by the nodes, and determining a unicast address feedback list based on the node states; and S12, matching unicast addresses in the unicast address feedback list with unicast addresses in a unicast address scan list corresponding to the target node to obtain a matching result, and determining a TTL value of the target node based on the matching result;

where the target node is a node in the multi-hop network, and the unicast address scan list is a list of addresses of all nodes in the multi-hop network that are in a working state detected by the target node.

Regarding the foregoing steps S11 and S12, it should be noted that in the embodiment of the present application, multi-hop networks are constructed by nodes, including devices such as computers and cell phones, all of which are connected to each other wirelessly and then can forward data to each other over the network. The data hop from a node to another until it reaches the destination. Unless all nodes fail, the data is always available, thereby making this network topology reliable and scalable.

A multi-hop network, whose backbone network is composed of nodes, is connected to the Internet and is responsible for providing multi-hop network connections to clients. Based on mutual cooperation and collaboration among numerous nodes distributed in a mesh, the multi-hop network has not only the advantages of broadband, high speed and high spectral efficiency, but also outstanding features such as dynamic self-organization, self-configuration and self-maintenance.

Time to live, referred to as TTL, the value of which is used to characterize the hop count in a multi-hop network.

Multi-hop networks include wireless mesh networks, mobile AdHoc networks (also known as self-organizing networks), wireless sensor networks, and wireless relay networks, to name a few. For a mesh network, the TTL value is also called "a maximum hop count," for a mobile AdHoc network, the TTL value is also called "a maximum segment hop count", and for a wireless sensor network or wireless relay network, the TTL value is also called "a limit number of transit." Therefore, for different types of multi-hop networks, their TTL values have different names.

In a multi-hop network, the lifetime of packets in the network can be controlled by setting the TTL value for each node. All packets in each multi-hop network include a TTL field for limiting the hop count for packet relaying. When each packet is sent, an initial TTL value on the TTL field of the packet can be formed by a node serving as a message source based on a preset TTL value of the sent packet to form.

In the traditional method for determining the TTL value of a node in a multi-hop network is determined based on experience. After the TTL value of the node is determined, it will be invariable during the whole product life cycle. As a result, such node in a multi-hop network fail to adapt to a wider network scanning range, or redundant repeated transmissions are prone to occur in the compact multi-hop network range. Therefore, the method for determining the TTL value of node needs to be improved.

The method of the embodiment of the present application is used to determine the TTL value of the node, so that the multi-hop network node can adapt to a wider multi-hop network scanning range, or redundant repeated transmissions are unlikely to occur in the compact multi-hop network range.

There are multiple nodes throughout the multi-hop network, and the TTL value corresponding to each node needs to be determined. Therefore, the determination process of a TTL value is performed separately for each node in the multi-hop network, and the determination process for each node is implemented using the method of the embodiment of the present application. A node in the multi-hop network performing the TTL value determination process is served as the target node according to the method of the embodiment of the present application.

In the embodiment of the present application, the target node is provided with a unicast address scan list. The unicast refers to a separate data channel established between the target node and other nodes in a multi-hop network. The unicast address is a unique address identification of a node that establish a channel with the target node. These unicast addresses form a unicast address scan list. Here, the unicast address in the unicast address scan list indicates a node in working state, which is scanned by the target node. The node in working state is a node that can be detected by another node to be in online state, or a node that can feed back its node state to another node.

In the process of determining the TTL value of the target node, the target node sends packets for requesting node states to other nodes (i.e., non-target nodes) in the multi-hop network based on a currently set TTL value (i.e., the currently planned TTL value), acquires the node states of other nodes successfully receiving the packets, and extract the unicast address feedback list based on the node states. The target node is able to know the corresponding unicast address of a node based on the node state fed back therefrom, so that it can collect other nodes capable of feeding back node states within the scan range of the currently planned TTL value of the target node, and then generate the required unicast address feedback list.

After acquiring the unicast address feedback list, the target node matches the unicast address feedback list with the unicast address scan list corresponding to the target node. Both lists contain unicast addresses, and the unicast addresses are matched to obtain the matching result. Based on the matching result, it can be determined whether the currently planned TTL value can match the two lists, to further determine the TTL value of the target node.

According to the method for determining TTL value of multi-hop network node provided by the embodiment of the present application, a node sends the packets for requesting the node states to other nodes according to different TTL values, the node states are collected to generate the unicast address feedback list, unicast addresses in the unicast address feedback list are matched with unicast addresses in the acquired unicast address scan list, and the TTL value which should be set each time the node sends the packet is determined based on the matching result, to ensure that no redundant and invalid repeated transmissions are generated when packets are transmitted to other nodes in the network.

Figure 2:
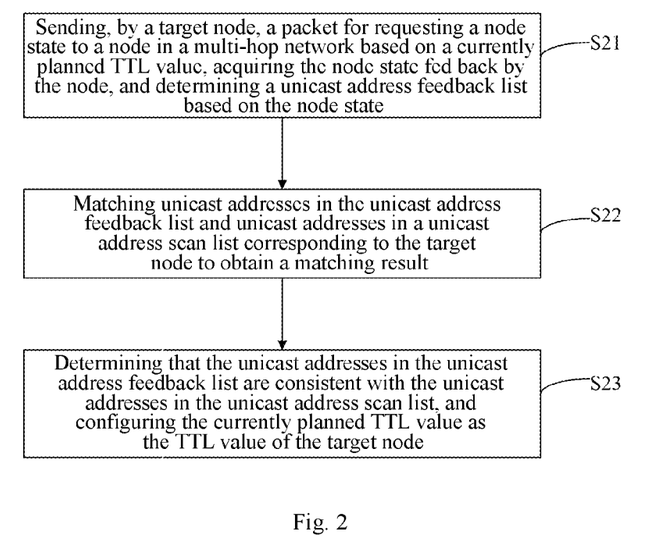
FIG. 2 is a schematic flowchart of a method for determining a TTL value of a multi-hop network according to an embodiment of the present application.

FIG. 2 is a schematic flowchart of a method for determining a TTL value of a node in a multi-hop network according to an embodiment of the present application. As shown in FIG. 2, the method includes:

S21, sending, by a target node, packets for requesting node states to nodes in a multi-hop network based on a currently planned TTL value, acquiring the node states fed back by the nodes, and determining a unicast address feedback list based on the node states;

S22, matching unicast addresses in the unicast address feedback list with unicast addresses in a unicast address scan list corresponding to the target node to obtain a matching result; and S23, determining that the unicast addresses in the unicast address feedback list are consistent with the unicast addresses in the unicast address scan list, then configuring the currently planned TTL value as the TTL value of the target node.

Regarding step S23, it should be noted that in the embodiment of the present application, during the matching process, when it is determined that the unicast addresses in the unicast address feedback list are consistent with the unicast addresses in the unicast address scan list, the target node configures the currently planned TTL value as the TTL value of the packet sent by the target node.

Figure 3:
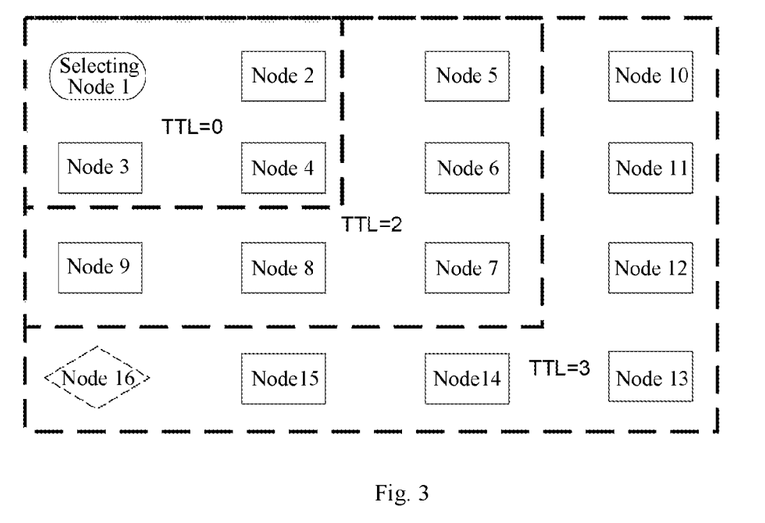
FIG. 3 is a schematic diagram of a determination process for a TTL value of a node in a multi-hop network using the method for determining a TTL value of a node in a multi-hop network according to an embodiment of the present application.

FIG. 3 is a schematic diagram of a determination process for a TTL value of a node in a multi-hop network using a method for determining a TTL value of a node in a multi-hop network according to an embodiment of the present application. As shown in FIG. 3, the target node is a selected node 1, nodes in the working state that can be scanned by the target node are node 2 to node 15, while node 16 is a node that is offline or has a failure. Then, a unicast address scan list including node 2 to node 15 can be acquired. When the currently planned TTL value=3, node 1 sends packets for requesting node states to other nodes in the network based on the TTL value=3. It can be seen from FIG. 3 that node 2 to node 16 are in the scanning range when TTL value=3, and only node 2 to node 15 can receive the packets and feedback the node states. In this case, node 1 can acquire a unicast address feedback list including node 2 to node 15, based on the node states that can be fed back.

The acquired unicast address feedback list is matched with the acquired unicast address scan list by node 1, and it is determined that the unicast addresses of both lists are consistent, thus the TTL value of the packet sent by the target node is determined to be 3.

In the embodiment of the present application, as shown in FIG. 3, in the process of determining the TTL value of the target node, matching the both lists needs to be performed in an incremental trial starting from a minimum TTL value. No matter which TTL value is tried, the list matching process is the same, and finally the TTL value of the node is determined according to the matching result.

Here, since the TTL value specified by the multi-hop protocol is 0, 2, 3, 4, ..., the minimum TTL value is 0. It should be noted that when TTL value=0, it actually means that the hop count of the packet in the multi-hop network is 1.0 means that the packet is not relayed and forwarded.

For the method for determining TTL value of node in a multi-hop network according to the embodiment of the present application, a node sends the packets for requesting the node states to other nodes according to different TTL values, the node states are collected to generate the unicast address feedback list, unicast addresses of the unicast address feedback list are matched with those in the acquired unicast address scan list, and the TTL value which should be set each time the node sends the packet is determined based on the matching result, to ensure that no redundant and invalid repeated transmissions are generated when packets are transmitted to other nodes in the network.

Figure 4:
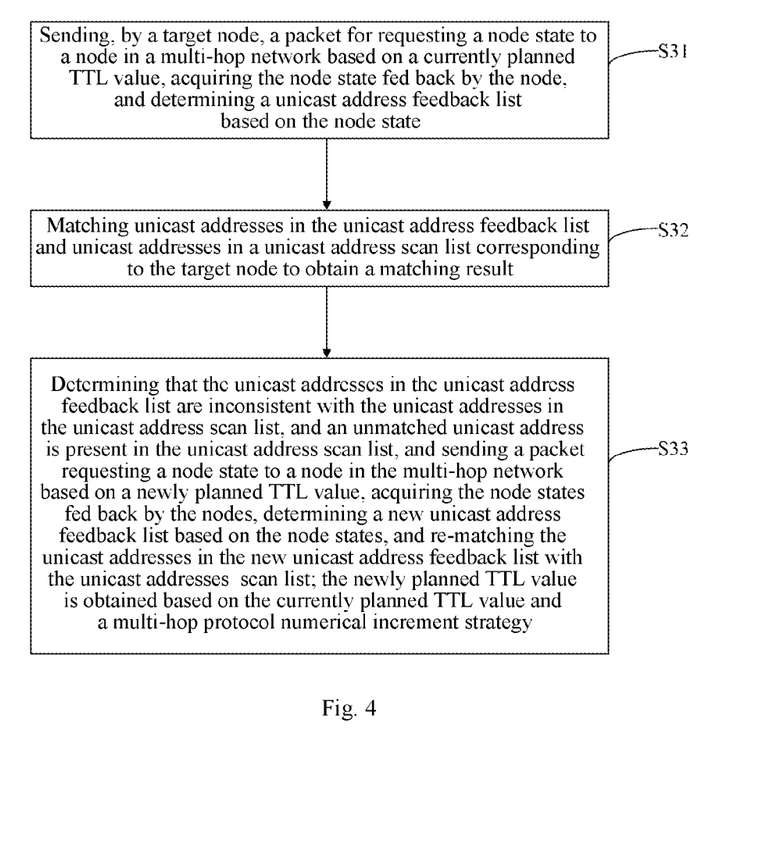
FIG. 4 is a schematic flowchart of a method for determining a TTL value of a node in a multi-hop network according to an embodiment of the present application.

FIG. 4 is a schematic flowchart of a method for determining a TTL value of a node in a multi-hop network according to an embodiment of the present application. As shown in FIG. 4, the method includes:

S31, sending, by a target node, packets for requesting node states to nodes in a multi-hop network based on a currently planned TTL value, acquiring the node states fed back by the nodes, and determining a unicast address feedback list based on the node states;

S32, matching unicast addresses in the unicast address feedback list and unicast addresses in a unicast address scan list corresponding to the target node to obtain a matching result; and S33, determining that the unicast addresses in the unicast address feedback list are inconsistent with the unicast addresses in the unicast address scan list, and an unmatched unicast address is present in the unicast address scan list, then sending packets for requesting the node states to the nodes in the multi-hop network based on a newly planned TTL value, acquiring the node states fed back by the nodes, determining a new unicast address feedback list based on the node states, and re-matching unicast addresses in the new unicast address feedback list with the unicast addresses in the unicast address scan list; the newly planned TTL value is obtained based on the currently planned TTL value and a multi-hop protocol numerical increment strategy.

Regarding step S33, it should be noted that, in the embodiment of the present application, after the unicast address feedback list is acquired, unicast addresses in the unicast address feedback list are matched, by the target node, with those in the unicast address scan list corresponding to the target node. During the matching process, when it is determined that the unicast addresses in the unicast address feedback list and those in the unicast address scan list are inconsistent and there are unmatched unicast addresses in the unicast address scan list, packets for requesting node states are sent to the nodes in the multi-hop network based on a newly planned TTL value, the node states fed back from the nodes are acquired, a new unicast address feedback list is extracted based on the node states, and the unicast address in the new unicast address feedback list are re-matched with those in the unicast address scan list. The newly planned TTL value is acquired based on the currently planned TTL value and the multi-hop protocol numerical increment strategy.

In the embodiment of the present application, when it is determined that the unicast addresses in the unicast address feedback list and those in the unicast address scan list are inconsistent and there are unmatched unicast addresses in the unicast address scan list, namely there are more unicast addresses in the unicast address scan list than in the unicast address feedback list, accompanied by unmatched unicast address, it indicates that not all nodes in the unicast address scan list are scanned, when the currently planned TTL value is used as the TTL value for packets sent by the target node. Therefore, it is necessary to increase the currently planned TTL value, and then use the increased TTL value as a new currently planned TTL value (i.e., the newly planned TTL value) to send packets for requesting node states to nodes in the multi-hop network to acquire fed back nodes states. The new unicast address feedback list based on the node states is extracted, and the unicast address in the new unicast address feedback list and those in the unicast address scan list are compared again.

In the embodiment of the present application, since the minimum value of the TTL value specified by the multi-hop protocol is 0, the initial value of the node TTL value determined by the embodiment of the present application is 0. The TTL value is a natural number excluding 1, thus the multi-hop protocol numerical increment strategy includes:

determining the newly planned TTL value based on a first numerical interval when the currently planned TTL value is an initial value; as an illustration, the currently planned TTL value is 0, then the newly planned TTL value is 2, hence, the first numerical interval is 2.

determining the newly planned TTL value based on a second numerical interval when the currently planned TTL value is not an initial value (i.e., the value is not 0); as an illustration, the currently planned TTL value is a natural number greater than or equal to 2, then the newly planned TTL value is increased by 1 to the currently planned TTL value, hence, the second numerical interval is 1.

Continuing the illustration with the schematic diagram of the process of determining TTL value shown in FIG. 3, it can be seen that the target node is the selected node 1, the nodes in working state that can be scanned by the target node are node 2 to node 15, while node 16 is a node that is offline or has a failure. Then, a unicast address scan list which includes node 2 to node 15 can be acquired. When the currently planned TTL value=0, node 1 send packets requesting node states to other nodes in the network in a manner TTL value=0. As shown in FIG. 3, node 2 to node 4 are in the scanning range when TTL value=0, thus, only node 2 to node 4 can receive the packets and feedback the node states. At this point, node 1 acquires a unicast address feedback list based on the node states that can be fed back, which includes node 2 to node 4.

The acquired unicast address feedback list is compared with the acquired unicast address scan list by node 1, and it is determined that there are unmatched node 5 to node 15 in the unicast address scan list, thus the target node increases the TTL value=0 to the TTL value=2 and continues to send packets for requesting node states. At this point, it can be seen from FIG. 3 that node 2 to node 9 are in the scanning range when TTL value=2, thus, only node 2 to node 9 can receive the packets and feedback the node states. Then, node 1 can acquire the unicast address feedback list including node 2 to node 9, based on the node states that can be fed back.

The acquired unicast address feedback list is compared with the acquired unicast address scan list by the node 1, and it is determined that there are unmatched node 10 to node 15 in the unicast address scan list, thus the target node increases the TTL value=2 to the TTL value=3 and resends packets requesting node states. It can be seen from FIG. 3 that node 2 to node 16 are in the scanning range when TTL value=3, thus, only node 2 to node 15 can receive the packets and feedback the node states. Then, node 1 can acquire the unicast address feedback list including node 2 to node 15, based on the node states that can be fed back.

The acquired unicast address feedback list is matched with the acquired unicast address scan list by the node 1, and it is determined that the unicast addresses of the both lists are consistent, thus the TTL value of the packets sent by the target node is determined to be 3.

For the method for determining TTL value of node in a multi-hop network according to the embodiment of the present application, a node sends the packets for requesting the node states to other nodes based on different TTL values, the node states are collected to generate the unicast address feedback list, addresses in the unicast address feedback list are matched with those in the acquired unicast address scan list, and the TTL value which should be set each time the node sends the packet is determined based on the matching result, to ensure that no redundant and invalid repeated transmissions are generated when packets are transmitted to other nodes in the network.

Figure 5:
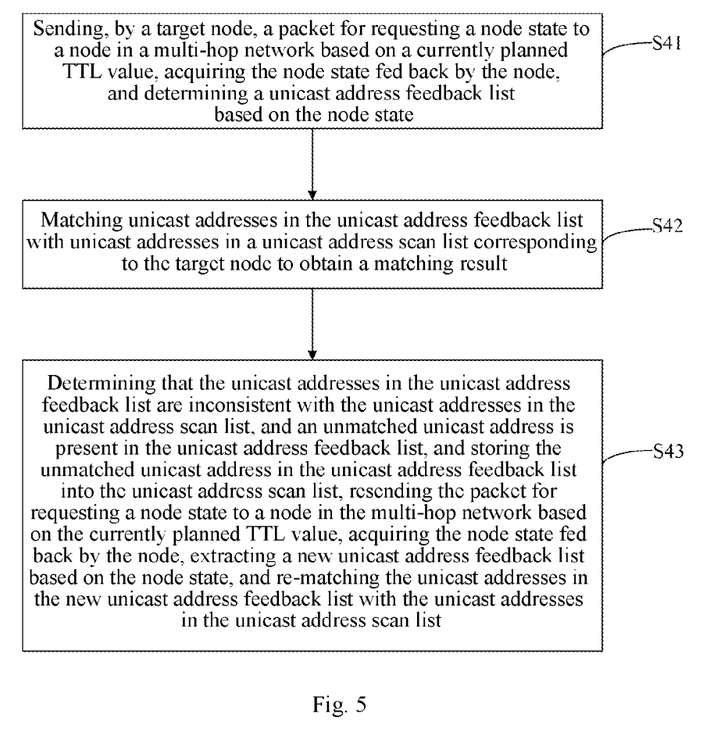
FIG. 5 is a schematic flowchart of a method for determining a TTL value of a node in a multi-hop network according to an embodiment of the present application.

FIG. 5 is a schematic flowchart of a method for determining a TTL value of a node in a multi-hop network according to an embodiment of the present application. As shown in FIG. 5, the method includes:

S41, sending, by a target node, packets for requesting node states to nodes in a multi-hop network based on a currently planned TTL value, acquiring the node states fed back by the nodes, and determining a unicast address feedback list based on the node states;

S42, matching unicast addresses in the unicast address feedback list and unicast addresses in a unicast address scan list corresponding to the target node to obtain a matching result; and S43, determining that the unicast addresses in the unicast address feedback list are inconsistent with the unicast addresses in the unicast address scan list, and an unmatched unicast address is present in the unicast address feedback list, then storing the unmatched unicast address in the unicast address feedback list into the unicast address scan list, resending packets for requesting the node states to the nodes in the multi-hop network based on the currently planned TTL value, acquiring the node states fed back by the nodes, extracting a new unicast address feedback list based on the node states, and re-matching the unicast addresses in the new unicast address feedback list with the unicast addresses in the unicast address scan list.

Regarding step S43, it should be noted that, in the embodiment of the present application, after the unicast address feedback list is acquired, unicast addresses in the unicast address feedback list are matched, by the target node, with those in the unicast address scan list corresponding to the target node. During the matching process, when it is determined that the unicast addresses in the unicast address feedback list and those in the unicast address scan list are inconsistent and there are unmatched unicast addresses in the unicast address feedback list, the unmatched unicast addresses in the unicast address feedback list are stored in the unicast address scan list, packets for requesting node states are resent to the nodes in the multi-hop network based on the currently planned TTL value, the node states fed back from the nodes are acquired, a new unicast address feedback list based on the node states is extracted, and the unicast address in the new unicast address feedback list and those in the unicast address scan list is re-matched.

In the embodiment of the present application, when it is determined that the unicast addresses in the unicast address feedback list and the unicast address scan list are inconsistent and there are unmatched unicast addresses in the unicast address feedback list, namely there are more unicast addresses in the unicast address feedback list than in the unicast address scan list, accompanied by redundant unmatched unicast addresses, it indicates that not only all nodes on the unicast address scan list can be scanned, but also other nodes within the scanning range of the currently planned TTL value and in the working state again can be covered, when the currently planned TTL value is used as the TTL value for packets sent by the target node. Therefore, it is necessary to store the unmatched unicast addresses in the unicast address feedback list into the unicast address scan list, and resend the packets for requesting the node states to the nodes in the multi-hop network according to the currently planned TTL value, and acquire the node states fed back from the nodes. A new unicast address feedback list based on the node states is extracted, and the unicast addresses in the new unicast address feedback list are re-matched with those in the unicast address scan list.

Figure 6:
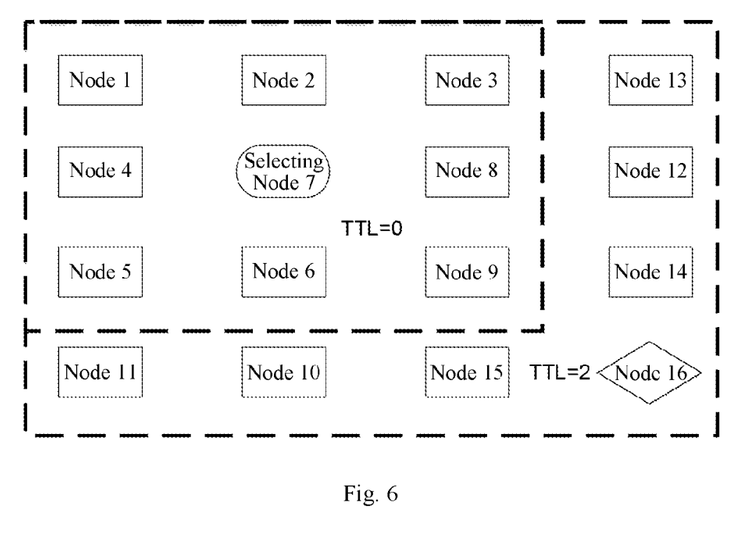
FIG. 6 is a schematic diagram of a determination process for a TTL value of a node in a multi-hop network using a method for determining a TTL value of a node in a multi-hop network according to an embodiment of the present application.

FIG. 6 is a schematic diagram of a determination process for TTL values of node in a multi-hop network using a method for determining a TTL value of a node in a multi-hop network according to an embodiment of the present application. As shown in FIG. 6, the target node is a selected node 7, nodes in the working state that can be scanned by the target node are node 1 to node 6, and node 8 to node 15, while node 16 is a node that is offline or has a failure. Then, a unicast address scan list including node 1 to node 6 and node 8 to node 15 can be acquired. When the currently planned TTL value=2, node 7 sends packets for requesting node states to other nodes in the network in a manner TTL value=2. It can be seen from FIG. 6 that node 1 to node 6 and node 8 to node 16 are in the scanning range when TTL value=2. Here, node 16 is a node that is in the working state again, thus node 1 to node 6 and node 8 to node 16 can receive the packets and feedback the node states. At this point, node 7 acquires a unicast address feedback list including node 1 to node 6 and node 8 to node 16, based on the node states that can be fed back.

The acquired unicast address feedback list is compared with the acquired unicast address scan list by node 7, and it is determined that there is an unmatched unicast address 16 in the unicast address feedback list. At this point, the unicast address 16 needs to be added to the unicast address scan list. Then node 7 resends packets requesting node states to other nodes in the network based on the TTL value=2. In this case, the comparison result of both lists is that the unicast addresses in the unicast address feedback list are consistent with the unicast addresses in the acquired unicast address scan list, and the TTL value=2 is determined to be the TTL value for packets sent by the node 7.

In one embodiment of the embodiments of the present application, it should be noted that since there will be a situation in which a node is turning into a working state again, there will inevitably be a situation in which a node is turning into a non-working state. Continuing the illustration with the schematic diagram of the process of determining TTL value shown in FIG. 6. When the currently planned TTL value=2, node 7 sends packets to other nodes in the network in a manner TTL value=2. It can be seen from FIG. 6 that node 1 to node 6, and node 8 to node 16 are in the scanning range when TTL value=2. Here, node 16 is a node in the working state again, and node 6 is a node suddenly being in the non-working state. Therefore, node 1 to node 5, and node 8 to node 16 can receive the packets requesting the node states and feedback the node states. At this point, node 7 can acquire the unicast address feedback list including node 1 to node 5, and node 8 to node 16, based on the node states that can be fed back.

Then, the acquired unicast address feedback list is matched with the acquired unicast address scan list by the node 7, it is determined that there is an unmatched unicast address 16 in the unicast address feedback list, and also determined that there is an unmatched unicast address 6 in the unicast address scan list. The unicast address 16 is then added to the unicast address scan list.

Since there is an unmatched unicast address 6 in the unicast address scan list, packets for requesting node states are resent to other nodes in the network based on the TTL value=3. Due to the expansion of the scanning range, if there are other nodes that are turning into working state again and node 6 is still in non-working state, new unicast addresses continue to be added to the unicast address scan list. Node 7 continuously increases the TTL value and sends packets for requesting node states to other nodes in the network for matching lists, until the TTL value reaches a preset limit TTL value, where the preset limit TTL value is usually the maximum value set for a multi-hop network.

For the method for determining TTL value of node in a multi-hop network according to the embodiment of the present application, the packets for requesting the node states are sent to other nodes through a node based on different TTL values, the node states are collected to generate the unicast address feedback list, addresses in the unicast address feedback list are matched with those in the acquired unicast address scan list, and the TTL value which should be set each time the node sends the packet is determined based on the matching result, to ensure that no redundant and invalid repeated transmissions are generated when packets are transmitted to other nodes in the network.

In one embodiment of the foregoing embodiments, it should be noted that when the currently planned TTL value is the preset limit TTL value, and it is determined that the unicast address in the unicast address feedback list is inconsistent with the unicast address in the unicast address scan list, and there are unmatched unicast addresses in the unicast address scan list, the unicast address scan list should be re-acquired while not configuring the TTL value of the packet sent by the target node.

When it is determined that the unicast addresses in the unicast address feedback list and the unicast address scan list are inconsistent and there are unmatched unicast addresses in the unicast address scan list, namely there are more unicast addresses in the unicast address scan list than on the unicast address feedback list, accompanied by redundant and unmatched unicast addresses, it indicates that not all nodes in the unicast address scan list can be scanned when the preset limit TTL value is used as the TTL value for packets sent by the target node. In addition, since the TTL value is not able to be increased, the TTL value of the packet sent by the target node is not configured, and the unicast address scan list needs to be reacquired.

In one embodiment of the foregoing embodiments, it should be noted that steps of acquiring the unicast address scan list include:

sending packets for requesting node states to nodes in a multi-hop network based on a preset limit TTL value, acquiring the node states, extracting the unicast address list based on the node states, and matching unicast addresses in the unicast address list with unicast addresses in a unicast address initial list corresponding to the target node;

determining that the unicast addresses in the unicast address list are inconsistent with the unicast addresses in the unicast address initial list, and an unmatched unicast address is present in the unicast address initial list, then resending packets for requesting the node states to the nodes in the multi-hop network based on the preset limit TTL value, acquiring the node states, extracting a new unicast address list based on the node states, and continuing to match the unicast addresses in the new unicast address list with unicast addresses in the unicast address initial list; and until when the above steps are repeated a preset number of times, replacing the unicast address initial list with the latest acquired unicast address list, and configuring the latest acquired unicast address list as the unicast address scan list.

In this regard, it should be noted that when a configurator builds a multi-hop network based on various nodes, each time a node is accessed to the network, the accessed node will be recorded in the list until all desired nodes are accessed to the network to form a desired multi-hop network. In this case, the configurator will send a list of recorded nodes as the unicast address initial list to each node. Therefore, in the process of acquiring the unicast address scan list, each time the acquiring process is performed, the matching between the acquired unicast address list and the unicast address initial list will be performed, through which illegal nodes affecting the entire multi-hop network can be detected. By performing the process of acquiring the unicast address scan list multiple times, it is possible to avoid the influence of nodes in a less stable working state on the list, and thus to acquire a good list that is conducive to determine the TTL value of the node.

In one embodiment of the foregoing embodiments, it should be noted that steps of selecting the target node include: determining a set of nodes each having an unknown TTL value in the multi-hop network, and selecting any node from the set of nodes and configuring it as the target node. Here, it should be noted that the configurator determines a set of nodes whose TTL value is not determined in the multi-hop network, and any node is selected from the set of nodes to be a target node.

Figure 7:
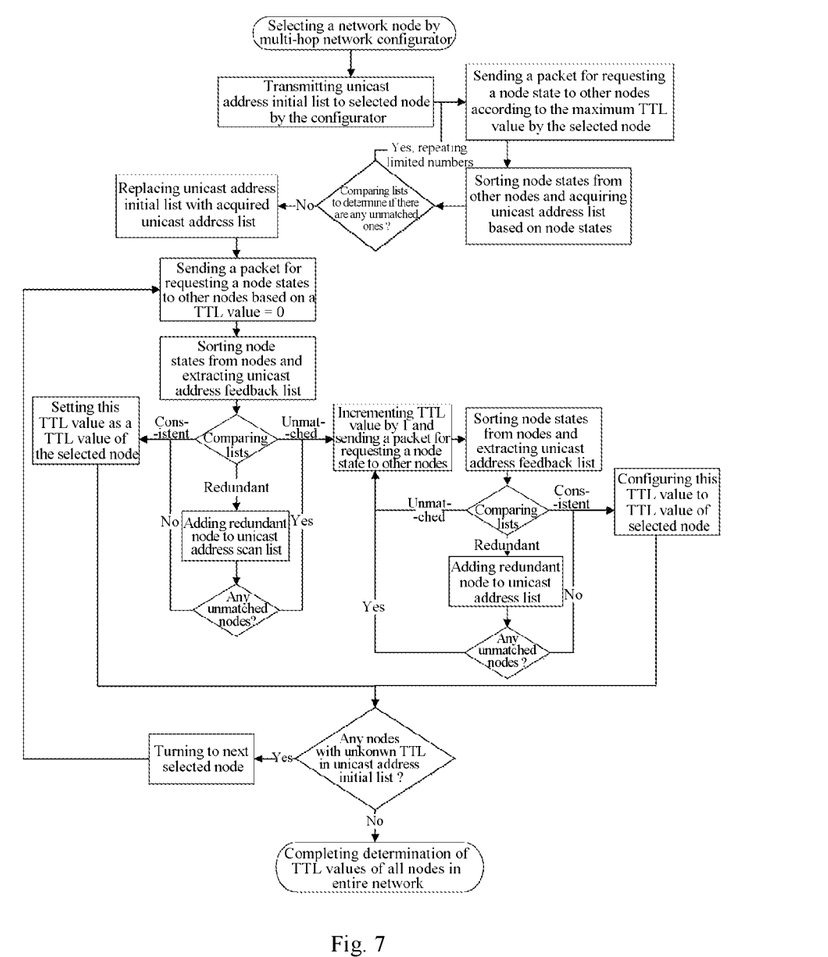
FIG. 7 is a schematic flowchart of a process including selecting a target node, acquiring a unicast address scan list, and determining a TTL value of a node according to an embodiment of the present application.

FIG. 7 is a schematic flowchart of a complete process including selecting a target node, acquiring a unicast address scan list, and determining a TTL value of a node based on the method of the foregoing embodiments. FIG. 7 can be understood in conjunction with the principles described in the foregoing embodiments, and thus will not be described in detail here.

Figure 8:
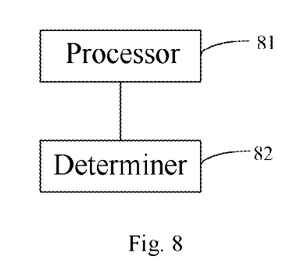
FIG. 8 is a schematic structural diagram of a device for determining a TTL value of a node in a multi-hop network according to an embodiment of the present application.

FIG. 8 shows a device for determining TTL value of node in a multi-hop network according to an embodiment of the present application, the device including a processing device 81 and a the determining device 82, where:

the processing device 81 is configured to send packets for requesting node states to nodes in a multi-hop network based on a currently planned TTL value, acquire the node states fed back by the nodes, and determine a unicast address feedback list based on the node states; and the determining device 82 is configured to match unicast addresses in the unicast address feedback list with unicast addresses in a unicast address scan list corresponding to a target node to obtain a matching result, and determine a TTL value of the target node based on the matching result;

where the processing device 81 and the determining device 82 belong to the target node, the target node is a node in the multi-hop network, and the unicast address scan list is a list of addresses of all nodes in the multi-hop network that are in a working state detected by the target node.

Since the principle of the device described in the embodiment of the present application is the same as that of the method described in the foregoing embodiments, detailed explanations will not be repeated here.

It should be noted that, in the embodiment of the present application, hardware processors may be used as related functional modules.

For the device for determining TTL value of node in a multi-hop network according to the embodiment of the present application, the packets for requesting the node states are sent to other nodes through a node according to different TTL values, the node states are collected to generate the unicast address feedback list, unicast addresses in the unicast address feedback list are matched with unicast addresses in the acquired unicast address scan list, and the TTL value which should be set each time the node sends the packet is determined based on the comparison result, to ensure that no redundant and invalid repeated transmissions are generated when packets are transmitted to other nodes in the network.

As one embodiment of the above-mentioned device embodiment, the determining device 82 is specifically configured to:

determine that the unicast addresses in the unicast address feedback list are consistent with the unicast addresses in the unicast address scan list, then configure the currently planned TTL value as the TTL value of the target node As one embodiment of the above-mentioned device embodiments, the determining device 82 is specifically configured to:

determine that the unicast addresses in the unicast address feedback list are inconsistent with the unicast addresses in the unicast address scan list, and an unmatched unicast address is present in the unicast address scan list, then send a processing instruction to the processing device 81 to cause the processing device 81 to send packets for requesting the node states to the nodes in the multi-hop network based on a newly planned TTL value, acquire the node states fed back by the nodes, and determine a new unicast address feedback list based on the node states; and re-match the unicast addresses in the new unicast address feedback list with unicast addresses in the unicast address scan list;

where the newly planned TTL value is obtained based on the currently planned TTL value and a multi-hop protocol numerical increment strategy.

As one embodiment of the above-mentioned device embodiments, the determining device 82 is specifically configured to:

determine that the unicast addresses in the unicast address feedback list are inconsistent with the unicast addresses in the unicast address scan list, and an unmatched unicast address is present in the unicast address feedback list, then store the unmatched unicast address in the unicast address feedback list into the unicast address scan list, and send a processing instruction to the processing device 81 to cause the processing device 81 to resend packets for requesting the node states to the nodes in the multi-hop network based on the currently planned TTL value, acquire the node states fed back by the nodes, and determine a new unicast address feedback list based on the node states; and re-match the unicast addresses in the new unicast address feedback list with unicast addresses in the unicast address scan list.

As one embodiment of the above-mentioned device embodiments, the determining device 82 is specifically configured to:

determine that the currently planned TTL value is a preset limit TTL value, and determine that the unicast addresses in the unicast address feedback list are inconsistent with the unicast addresses in the unicast address scan list, and an unmatched unicast address is present in the unicast address scan list, and send a processing instruction to acquire a new unicast address scan list while not configuring the TTL value of the target node.

As one embodiment of the above-mentioned device embodiments, the device further includes an acquirer configured to send packets for requesting node states to nodes in a multi-hop network based on a preset limit TTL value, acquire the node states fed back by the nodes, determine a unicast address list based on the node states, and match unicast addresses in the unicast address list with unicast addresses in a unicast address initial list corresponding to the target node;

determine that the unicast addresses in the unicast address list are inconsistent with the unicast addresses in the unicast address initial list, and an unmatched unicast address is present in the unicast address initial list, then resend packets for requesting the node states to the nodes in the multi-hop network based on the preset limit TTL value, acquire the node states fed back by the nodes, determine a new unicast address list based on the node states, and re-match the unicast addresses in the new unicast address list with unicast addresses in the unicast address initial list; and until when the above steps are repeated a preset number of times, replace the unicast address initial list with the lastly acquired unicast address list, and configure the lastly acquired unicast address list as the unicast address scan list;

where the acquirer belongs to the target node.

As one embodiment of the above-mentioned device embodiments, the device further includes a selector configured to determine a set of nodes each having an unknown TTL value in the multi-hop network, and select any node from the set of nodes and configure the selected node as the target node;

where the selector belongs to the target node.

As one embodiment of the above-mentioned device embodiments, the multi-hop protocol numerical increment strategy includes:

determining the newly planned TTL value based on a first numerical interval when the currently planned TTL value is an initial value; and determining the newly planned TTL value based on a second numerical interval when the currently planned TTL value is not an initial value.

An embodiment of the present application further provides a router, including the device for determining TTL value of multi-hop network node provided in the foregoing embodiments.

Figure 9:
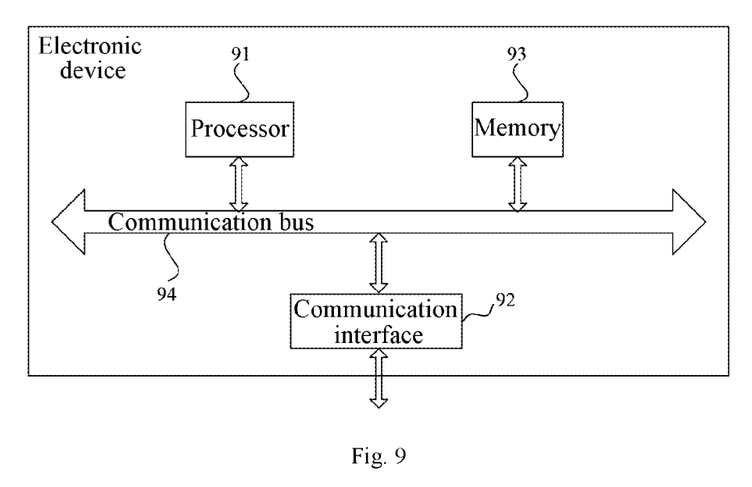
FIG. 9 is a schematic structural diagram of an electronic device according to an embodiment of the present application.

FIG. 9 is a schematic structural diagram of an electronic device. As shown in FIG. 9, the electronic device may include: a processor 91, a communication interface 92, a memory 93, and a communication bus 94. The processor 91, the communication interface 92, and the memory 93 communicate with each other through the communication bus 94. The processor 91 may call logic instructions in the memory 93 to implement the following method: sending, by the target node, packets for requesting node states to nodes in a multi-hop network based on a currently planned TTL value, acquiring the node states fed back by the nodes, and determining a unicast address feedback list based on the node states; and matching unicast addresses in the unicast address feedback list with unicast addresses in a unicast address scan list corresponding to the target node to obtain a matching result, and determining a TTL value of the target node based on the matching result; where the target node is a node in the multi-hop network, and the unicast address scan list is a list of addresses of all nodes in the multi-hop network that are in a working state detected by the target node.

In addition, the logic instructions in the memory 93 described above may be implemented in the form of a software functional unit and may be stored in a computer readable storage medium while being sold or used as a separate product. Based on such understanding, the embodiments of the present application or a part of the technical solutions that contributes to the prior art, or a part of the embodiments, may be embodied in the form of a software product, which is stored in a storage medium, including several instructions to cause a computer device (which may be a personal computer, server, or network device, etc.) to perform all or part of the steps of the methods described in the respective embodiments of the present application. The storage medium described above includes various media that can store program codes such as U disk, mobile hard disk, read-only memory (ROM), random access memory (RAM), magnetic disk, and compact disk.

In another aspect, a computer program product is further disclosed in the present application. The computer program product includes computer programs stored on a non-transitory computer-readable storage medium, and the computer programs includes program instructions, when executed by a computer, the program instructions cause the computer to implement the method according to the above-mentioned method embodiments, for instance, including: sending, by a target node, packets for requesting node states to nodes in a multi-hop network based on a currently planned TTL value, acquiring the node states fed back by the nodes, and determining a unicast address feedback list based on the node states; and performing unicast address matching between the unicast address feedback list and a unicast address scan list corresponding to the target node to obtain a matching result, and determining a TTL value of the target node based on the matching result; where the target node is a node in the multi-hop network, and the unicast address scan list is a list of addresses of all nodes in the multi-hop network that are in a working state detected by the target node.

In yet another aspect, a non-transitory computer-readable storage medium is further provided in an embodiment of the present application, having stored thereon computer programs, when the computer programs are executed by a processor, the processor implements the method provided by the above-mentioned method embodiments, for instance, including: sending, by a target node, packets for requesting node states to nodes in a multi-hop network based on a currently planned TTL value, acquiring the node states fed back by the nodes, and determining a unicast address feedback list based on the node states; and matching unicast addresses in the unicast address feedback list and unicast addresses in a unicast address scan list corresponding to the target node to obtain a matching result, and determining a TTL value of the target node based on the matching result; where the target node is a node in the multi-hop network, and the unicast address scan list is a list of addresses of nodes in the multi-hop network that are detected by the target node to be in a working state.

The device embodiments described above are merely illustrative, where the units described as separate components may or may not be physically separate, and the components displayed as units may or may not be physical units, that is, may be located at the same place or be distributed to multiple network units. Some or all of the modules may be selected according to actual needs to achieve the purpose of the solution of the embodiments.

Through the description of the embodiments above the various embodiments can be implemented by means of software and a necessary general hardware platform, and of course, by hardware. Based on such understanding, the embodiments of the present application in essence or a part of the embodiments that contributes to the prior art, or a part of the embodiments, may be embodied in the form of a software product, which may be stored in a storage medium such as ROM/RAM, magnetic disk, and compact disk, and includes several instructions to cause a computer device (which may be a personal computer, server, or network device, etc.) to perform the methods described in various embodiments or a part thereof.

Finally, it should be noted that the embodiments above are only used to explain the embodiments of the present application, and are not limited thereto; although the present application has been described in detail with reference to the foregoing embodiments, modifications and substitutions do not make the essence of the corresponding embodiments.

What is claimed is:

1. A system for determining a time-to-live ("TTL") value of a node in a multi-hop network, the system comprising:
   a processor in a computer separate from the node, wherein the processor is configured to:
   identify a set of nodes each having an unknown TTL value in the multi-hop network, and
   configure one node from the set of nodes as a target node; and
   a target node, wherein the target node is configured to:
   send a packet for requesting a node state to the node in the multi-hop network based on a currently planned TTL value,
   acquire the node state fed back by the node,
   determine a unicast address feedback list based on the node state,
   match, unicast addresses in the unicast address feedback list and unicast addresses in a unicast address scan list corresponding to the target node to obtain a matching result, and
   determine a TTL value of the target node based on the matching result;
   wherein the unicast address scan list is a list of addresses of all nodes in the multi-hop network that are in a working state detected by the target node.

2. The system of claim 1, wherein the target node is further configured to:
   determine that the unicast addresses in the unicast address feedback list are consistent with the unicast addresses in the unicast address scan list, and configure the currently planned TTL value as the TTL value of the target node.

3. The system of claim 1, wherein the target node is further configured to:
   determine that the unicast addresses in the unicast address feedback list are inconsistent with the unicast addresses in the unicast address scan list and an unmatched unicast address is present in the unicast address scan list, and send a packet for requesting a node state to a node in the multi-hop network based on a newly planned TTL value, acquire the node state fed back by the node, determine a new unicast address feedback list based on the node state, and re-match unicast addresses in the new unicast address feedback list with unicast addresses in the unicast address scan list;

wherein the newly planned TTL value is configured to be obtained based on the currently planned TTL value and a multi-hop protocol numerical increment strategy.

4. The system of claim 1, wherein the target node is further configured to:
   determine the unicast addresses in the unicast address feedback list are inconsistent with the unicast addresses in the unicast address scan list and an unmatched unicast address is present in the unicast address feedback list, and store the unmatched unicast address in the unicast address feedback list into the unicast address scan list, resend the packet for requesting a node state to a node in the multi-hop network based on the currently planned TTL value, acquire the node state fed back by the node, determine a new unicast address feedback list based on the node state, and re-match the unicast address in the new unicast address feedback list with the unicast addresses in the unicast address scan list.

5. The system of claim 1, wherein the processor is further configured to:
   determine that the currently planned TTL value is a preset limit TTL value, and the unicast addresses in the unicast address feedback list are inconsistent with the unicast addresses in the unicast address scan list and an unmatched unicast address is present in the unicast address scan list, and acquiring a new unicast address scan list while not configuring the TTL value of the target node.

6. The system of claim 1, wherein the target node is, further configured to acquire the unicast address scan list by following steps:
   sending the packet for requesting a node state to a node in the multi-hop network based on a preset limit TTL value, acquiring the node state fed back by the node, determining a unicast address list based on the node state, and matching unicast addresses in the unicast address list and unicast addresses in a unicast address initial list corresponding to the target node;
   determining that the unicast addresses in the unicast address list are inconsistent with the unicast addresses in the unicast address initial list and an unmatched unicast address is present in the unicast address initial list, and resending the packet for requesting a node state to a node in the multi-hop network based on the preset limit TTL value, acquiring the node state fed back by the node, determining a new unicast address list based on the node state, and re-matching unicast addresses in the new unicast address list with unicast addresses in the unicast address initial list; and
   replacing the unicast address initial list with a unicast address list acquired by performing a preset number of the matching, and configuring the acquired unicast address list as the unicast address scan list.

7. The system of claim 3, wherein the multi-hop protocol numerical increment strategy comprises:
   determining the newly planned TTL value based on a first numerical interval when the currently planned TTL value is an initial value; and
   determining the newly planned TTL value based on a second numerical interval when the currently planned TTL value is not an initial value.

8. A device for determining a time-to-live ("TTL") value of a node in a multi-hop network, comprising:
   a first sub-processor configured to identify a set of nodes each having an unknown TTL value in the multi-hop network, and configure one node from the set of nodes as a target node;
   a second sub-processor configured to send a packet for requesting a node state to a node in the multi-hop network based on a currently planned TTL value, acquire the node state fed back by the node, and determine a unicast address feedback list based on the node state; and
   a third sub-processor configured to match unicast addresses in the unicast address feedback list and unicast addresses in a unicast address scan list corresponding to a target node to obtain a matching result, and determine a TTL value of the target node based on the matching result;
   wherein the target node is a node in the multi-hop network, and the unicast address scan list is a list of addresses of all nodes in the multi-hop network that are in a working state detected by the target node.

9. The device of claim 8, wherein the third sub-processor is further configured to:
   determine that the unicast addresses in the unicast address feedback list are consistent with the unicast addresses in the unicast address scan list, and configure the currently planned TTL value as the TTL value of the target node.

10. The device of claim 8, wherein the third sub-processor is further configured to:
    determine that the unicast addresses in the unicast address feedback list are inconsistent with the unicast addresses in the unicast address scan list, and an unmatched unicast address is present in the unicast address scan list, send a processing instruction to the second sub-processor to cause the second sub-processor to send the packet for requesting a node state to a node in the multi-hop network based on a newly planned TTL value, acquire the node state fed back by the node, and determine a new unicast address feedback list based on the node state; and
    re-match the unicast addresses in the new unicast address feedback list and unicast addresses in the unicast address scan list;
    wherein the newly planned TTL value is obtained based on the currently planned TTL value and a multi-hop protocol numerical increment strategy.

11. The device of claim 8, wherein the third sub-processor is further configured to:
    determine that the unicast addresses in the unicast address feedback list are inconsistent with the unicast addresses in the unicast address scan list, and an unmatched unicast address is present in the unicast address feedback list, then store the unmatched unicast address in the unicast address feedback list into the unicast address scan list, and send a processing instruction to the second sub-processor to cause the second sub-processor to resend the packet for requesting a node state to a node in the multi-hop network based on the currently planned TTL value, acquire the node state fed back by the nodes, and determine a new unicast address feedback list based on the node state; and
    re-match unicast addresses in the new unicast address feedback list and unicast addresses in the unicast address scan list.

12. The device of claim 8, wherein the third sub-processor is further configured to:

determine that the currently planned TTL value is a preset limit TTL value, and the unicast addresses in the unicast address feedback list are inconsistent with the unicast addresses in the unicast address scan list, and an unmatched unicast address is present in the unicast address scan list, and send a processing instruction to acquire a new unicast address scan list while not configuring the TTL value of the target node.

13. The device of claim 8, further comprising an acquirer configured to send the packet for requesting a node state to a node in a multi-hop network based on a preset limit TTL value, acquire the node state fed back by the node, determine the unicast address list based on the node state, and match unicast addresses in the unicast address list and unicast addresses in a unicast address initial list corresponding to the target node;

determine that the unicast addresses in the unicast address list are inconsistent with the unicast addresses in the unicast address initial list, and an unmatched unicast address is present in the unicast address initial list, then resend the packet for requesting a node state to a node in the multi-hop network based on the preset limit TTL value, acquire the node state fed back by the nodes, determine a new unicast address list based on the node states, and re-match the unicast addresses in the new unicast address list with unicast addresses in the unicast address initial list; and replace the unicast address initial list with a unicast address list acquired by performing a preset number of the matching, and configure the acquired unicast address list as the unicast address scan list;

wherein the acquirer belongs to the target node.

14. The device of claim 10, wherein the multi-hop protocol numerical increment strategy comprises:
 determining the newly planned TTL value based on a first numerical interval when the currently planned TTL value is an initial value; and
 determining the newly planned TTL value based on a second numerical interval when the currently planned TTL value is not an initial value.

15. A router, comprising the device of claim 8.

16. An electronic device, comprising a memory, a second sub-processor, and computer programs stored on the memory and executable on the second sub-processor, wherein the computer programs, when executed by the second sub-processor, causes the second sub-processor to implement steps of the method of claim 1.

17. A non-transitory computer-readable storage medium, having stored thereon computer programs, wherein the computer programs, when executed by a second sub-processor, causes the second sub-processor to implement steps of the method of claim 1.

* * * * *